June 13, 1967   R. J. LANE ETAL   3,324,660
JET PROPULSION POWER PLANTS
Filed Dec. 9, 1964   5 Sheets-Sheet 1
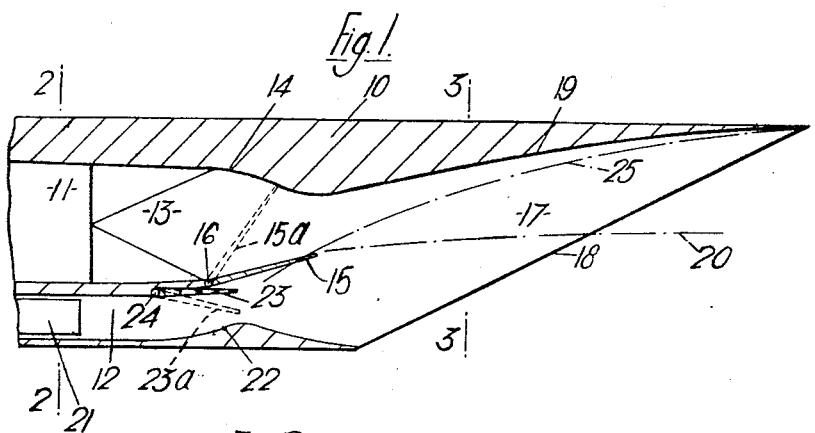
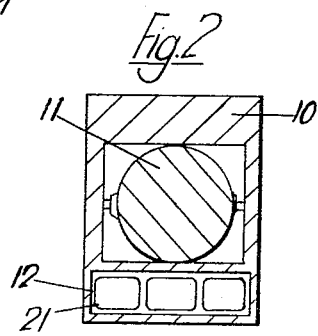
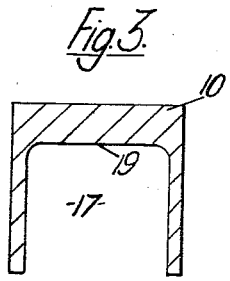
Inventors
RAYMOND JOHN LANE
PHILIP ERIC HARDY
JAMES WALLER SHARP
By Bailey, Stephen &
Huethof
Attorneys

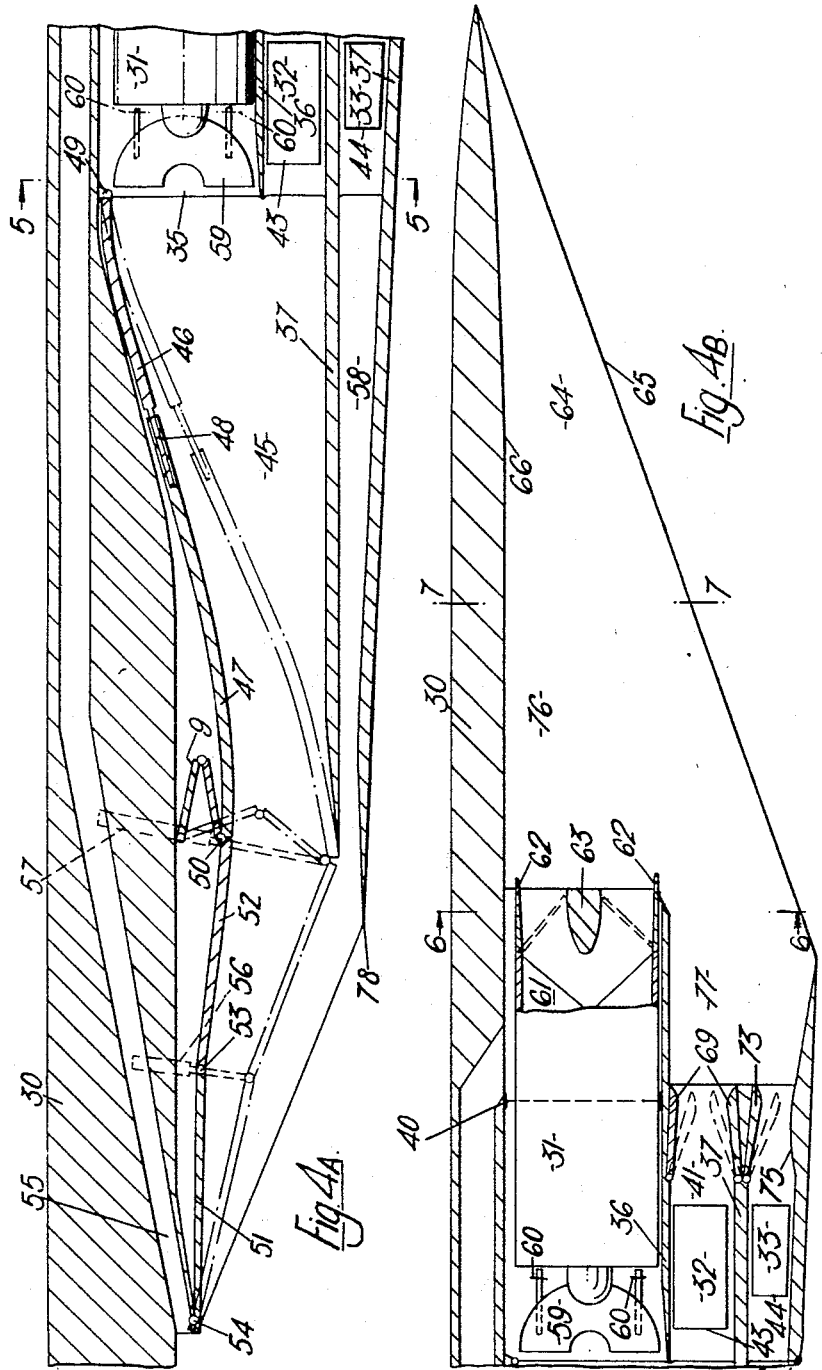

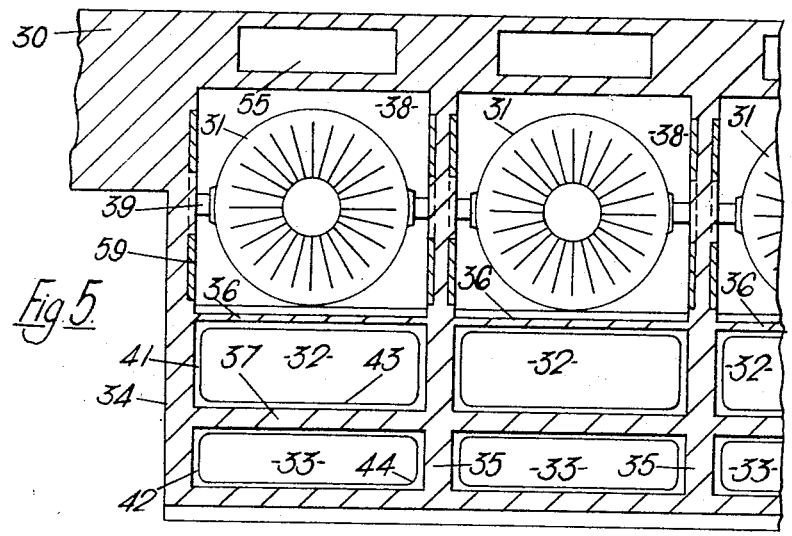
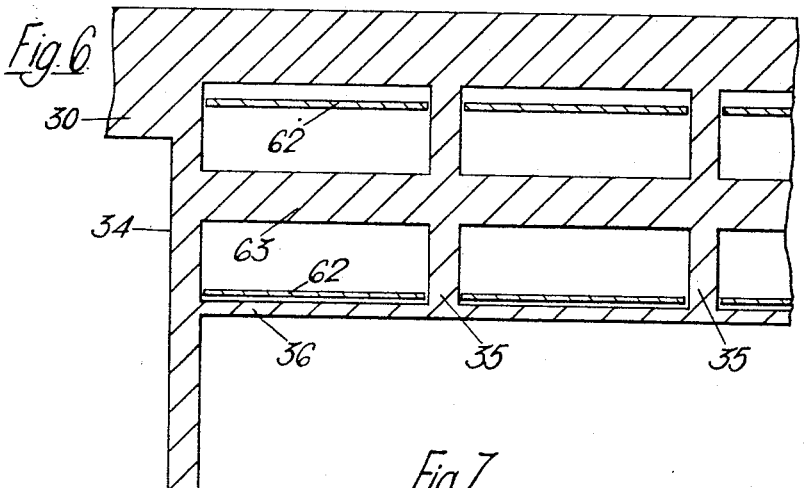
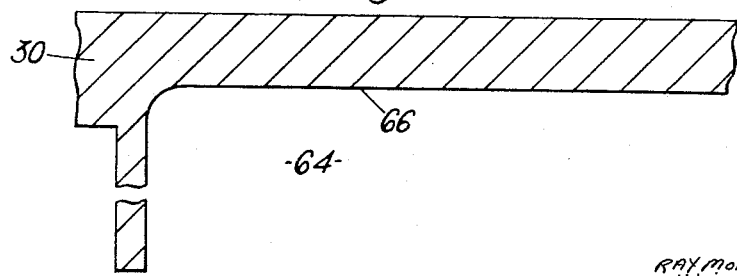

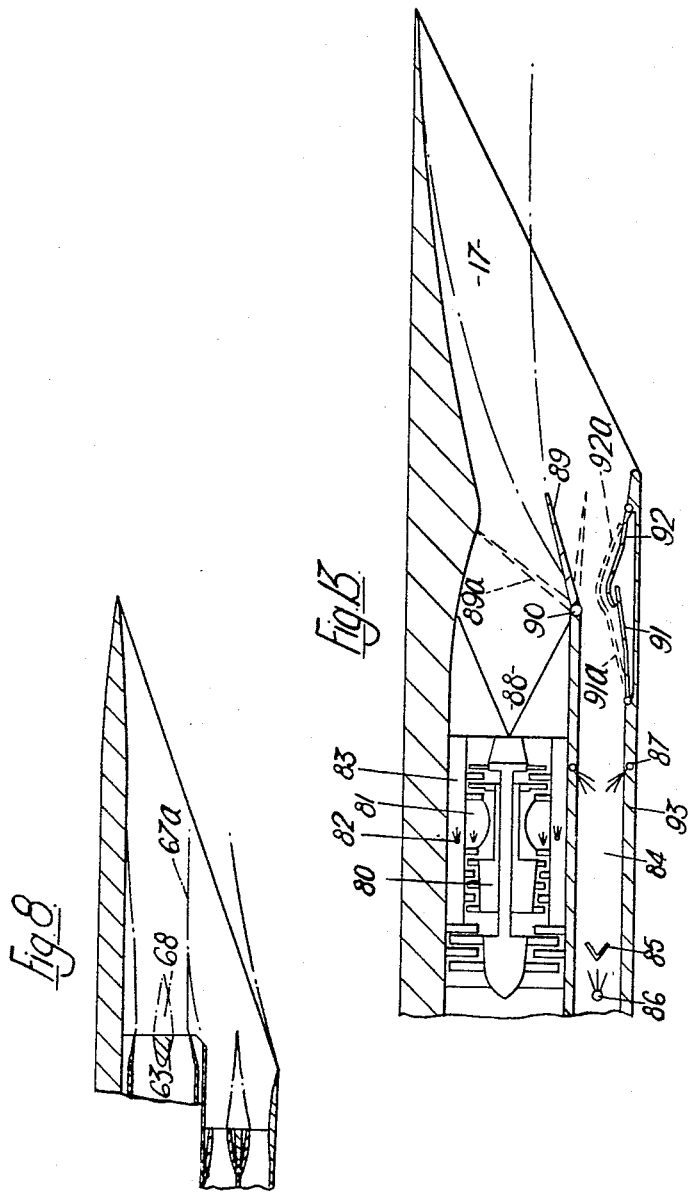

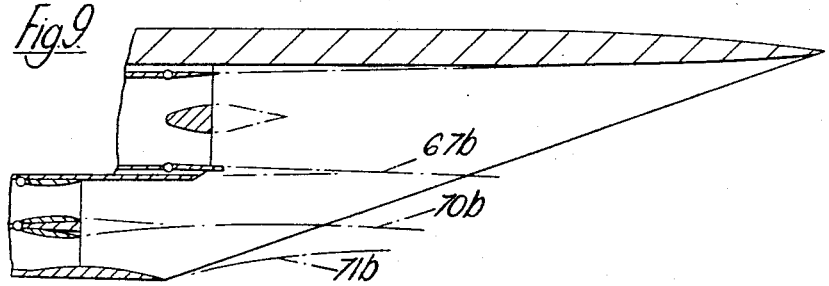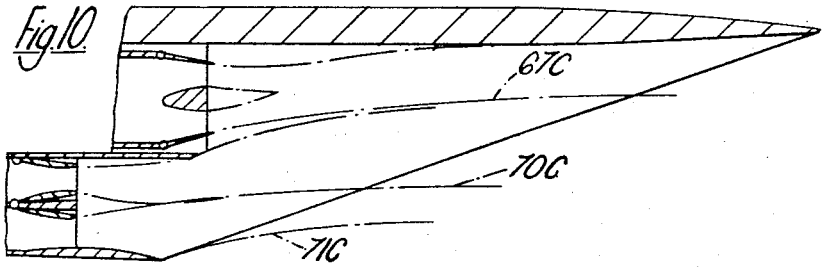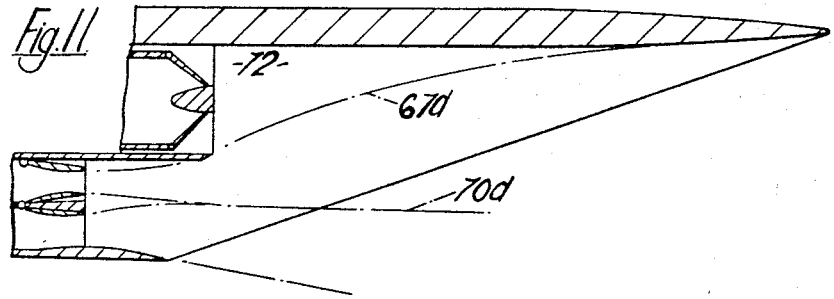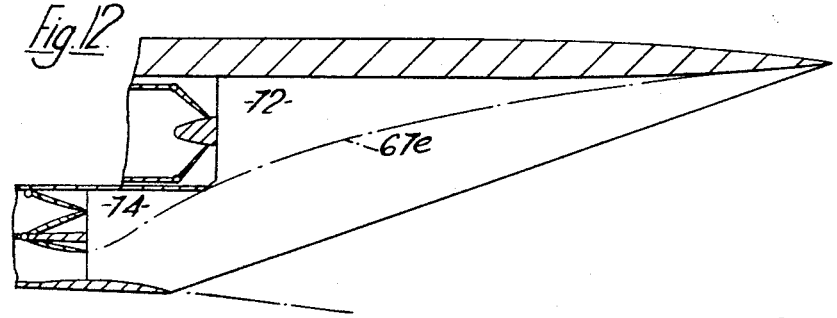

United States Patent Office 3,324,660
Patented June 13, 1967

3,324,660
JET PROPULSION POWER PLANTS
Raymond John Lane, Philip Eric Hardy, and James Walker Sharp, Bristol, England, assignors to Bristol Siddeley Engines Limited, Bristol, England, a British company
Filed Dec. 9, 1964, Ser. No. 416,985
Claims priority, application Great Britain, Dec. 12, 1963, 49,167/63
7 Claims. (Cl. 60—244)

The invention relates to power plants for aircraft propulsion comprising at least two jet propulsion engines suitable for operation respectively at progressively higher ranges of supersonic flight speeds. The exhaust of each engine has to be discharged through a nozzle, and the nozzles require adjustment to suit the varying expansion ratio if good efficiency is to be obtained. Furthermore, there are problems in avoiding base drag from the nozzles of engines which are shut down in certain phases of the flight speed range.

According to one feature of the invention, the power plant includes a separate nozzle for each engine, a trough structure into one end of which the nozzles discharge, that end of the trough being otherwise closed and the other end open, the nozzle of the lowest flight speed engine being adjacent to the base of the trough and the other nozzles being displaced therefrom towards the open side of the trough in the order of their increasing corresponding flight speeds, and means for preventing reverse flow through a lower speed engine when a higher speed engine is operating and it is not.

The nozzle system of the highest speed engine has to be suitable for operation at the highest pressure ratio and therefore requires the largest exit area. In the arrangement according to the invention the individual nozzle of the highest speed engine allows for only part of the required expansion, and the remainder of the expansion takes place in the trough, the cross-sectional area of the latter being chosen to provide the required effective exit area. The expansion into the trough takes place in a manner known in other contexts over a more or less stagnant recirculatory body of gas at higher than ambient pressure the boundary between the jet stream from the engine and the body of gas constituting a virtual expansion surface. The power plant includes means, lying between the higher speed engine and the lower speed engine, and constituting a step from which this boundary commences. Although this arrangement may be slightly less efficient than a properly shaped expansion surface, the advantages in respect of simplification of the nozzle structure and control system are considered to outweigh any losses. The individual nozzles of the other engines also open into the trough without requiring an increase in its cross-section area and therefore produce no additional base drag when inoperative in the highest flight speed range.

According to another feature of the invention, the power plant includes a first air intake diffuser passage for the engine of highest speed and a second air intake diffuser passage for the remainder of the power plant, and a single adjustable compression ramp system movable between a position in which it directs air into both diffuser passages and a position in which it directs air into the first diffuser passage and substantially blocks the second diffuser passage.

Three embodiments of the invention are shown in the accompanying drawings. In the drawings:

FIGURE 1 is a longitudinal section through the first embodiment;

FIGURES 2 and 3 are transverse sections corresponding to the lines 2—2 and 3—3 in FIGURE 1;

FIGURES 4A and 4B are two halves of a longitudinal section through the second embodiment;

FIGURES 5, 6 and 7 are transverse sections through the second embodiment corresponding to the lines 5—5, 6—6 and 7—7 in FIGURES 4A and 4B;

FIGURES 8 to 12 illustrate operation of the power plant at different flight Mach numbers; and FIGURE 13 is a longitudinal section of an embodiment similar in many respects to that shown in FIGURES 1, 2 and 3.

The embodiment shown in FIGURES 1 to 3 comprises a pod 10 for mounting in any suitable manner upon an aircraft, the pod housing a turbojet engine 11 for propelling the aircraft from take-off up to a lower supersonic flight speed, which might be for example Mach 2.5, and a ramjet engine 12 for propelling the aircraft from the lower to a higher supersonic flight speed, which might be for example Mach 4. In a transition phase, for example from about Mach 1 to Mach 3, both engines are operated.

The turbojet engine has an exhaust passage 13 changing from circular section to rectangular section and leading to a nozzle defined between a fixed upper convergent wall 14 and an adjustable lower convergent wall member 15 which is hinged to the lower wall of the exhaust passage at 16, and may be turned upwards to the position 15a, shown in dotted lines, to close the exhaust passage. The nozzle discharges into one end of a trough 17 which is open at its rear end. The trough has an open lower side 18 and a closed upper side wall or base 19, which is concavely curved to act as an expansion surface for the turbojet exhaust gases discharged over it. A chain-dotted line 20 indicates approximately the other boundary of the turbojet jet stream when the turbojet and the ramjet are operating simultaneously.

The ramjet engine 12 comprises three combustors 21, arranged side by side in its air passage, and a nozzle defined between a lower fixed wall 22 of convergent-divergent configuration and an adjustable upper lip 23 which is hinged to the air passage wall at 24. When the ramjet engine is not operating, the lip 23 is turned downwards to a partially closed position such as 23a, shown in dotted-lines, giving minimum drag, the cold air stream and underlying the hot jet stream from the turbojet engine, and the common boundary being somewhat below the line 20 owing to the hinged wall member 15 being in a more open setting.

During the transitional phase of simultaneous operation of the engines, the hot jet stream from the ramjet discharges along the trough 17 immediately below the hot turbojet jet stream, the common boundary being approximately as indicated by the chain-dotted line 20. When the upper limit of the turbojet range is reached, this engine is shut down and the lower wall member 15 of its nozzle is turned upwards to the position 15a shutting off its exhaust passage 13. The hot ramjet jet stream is then free to expand over the whole cross section of the trough 17. The upper boundary of the hot jet stream is indicated approximately by the chain-dotted line 25 which commences from the rear edge of the lip 23, which constitutes a step, and extends downstream through the trough 17 to meet the upper side wall or base 19. The zone between this boundary and the fixed upper side wall 19 becomes filled with more less stagnant or recirculatory body of exhaust gas at a pressure above ambient atmospheric pressure. Reverse flow of this hot gas through the turbojet engine 11 is prevented by the wall member 15 in its closure position 15a. The turbojet engine and the passage in which it is housed may be pressurised by air from the ramjet intake, and controlled escape of this air permitted by a small opening movement of the wall member 15.

FIGURES 4 to 7 illustrate a power plant mounted beneath a wing 30 of an aircraft and comprising three types of engines for operation at progressively higher flight speeds, namely a number of turbojet engines 31 for the lowest speed range, a combination ramjet engine 32 for the intermediate speed range and acceleration through the transonic range (the term "combination" indicating that it has a common air intake system with the turbojet engines) and a high speed ramjet engine 33 for the highest speed range.

The power plant is housed partly in the wing and partly in a nacelle 34 projecting below the wing, the nacelle being divided by vertical partitions 35 and upper and lower horizontal partitions 36 and 37 into three horizontal rows of longitudinally-extending rectangular-section passages. Each passage 38 of the top row contains a turbojet engine 31 supported on trunnions 39, the space between the circular casing of the engine and the walls of the passage being closed by a diaphragm structure 40, arranged preferably at the beginning of the hot end of the engine. Boundary layer air passages 55 open into the passages 38 downstream of the diaphragms 40, thus providing ventilation and cooling of the hot external parts of the engine. The heated air discharges around the turbojet nozzles presently described. Each of the passages 41 and 42 of the intermediate and bottom rows respectively contains fuel injection and flame holding equipment referred to collectively as combustors 43 and 44.

The turbojet passages 38 and the combination ramjet passages 41 extend rearwards from a common intake diffuser passage 45 of which a forward part of the lower horizontal partition 37 forms the lower wall, and the upper wall is formed by two members 46 and 47 engaging one another telescopically at 48. The rear member 46 is hinged to the upper wall of the turbojet passages at 49, while the forward member 47 is hinged at 50 to the rear end of an intake compression ramp which is composed of leading and trailing parts 51 and 52 hinged together at 53. At its forward end 54 the leading ramp member is pivoted to the lower wall of a duct 55 formed in the wing to carry away boundary layer air which would otherwise enter the engine air intake system and thereby reduce its efficiency. The ramp system is adjustable by jacks 56 and 57 from the take-off position, shown in full lines, to the high speed position, shown in chain-dotted lines, in which the hinge point 50 engages the leading edge of the lower horizontal partition 37 so that the diffuser passage 45 is substantially blocked and the intake air passes substantially wholly through a subsonic diffuser passage 58 leading to the high speed ramjet passages 42. The space above the wall members 46 and 47 is divided from the space above the ramps 51 and 52 by a folding partition 9. This allows the two spaces to be pressurised to different values for balancing the external pressures on the moving members. With this separate diffuser passage 58 for the high speed cruise condition, this diffuser passage can be designed for maximum efficiency in this condition and the maximum compression pressure produced by the diffuser passage 58 can exceed the pressure in the diffuser passage 45, without aggravating the problem of pressure balancing of the upper wall members 46 and 47.

To permit the turbojet engines 31 to be closed down, and the air flowing through them to be diverted through the combination ramjets 32, each engine is provided with a pair of intake end closure doors 59. These doors are hinged to the vertical walls at 60, and when open, retract into recesses in these walls. When closed, they protect the turbojet engines from the heat of the intake air at higher speeds.

Each turbojet engine has an exhaust passage 61 the cross section of which changes from circular to rectangular, the rectangular part having upper and lower walls in the form of hinged flaps 62 capable of being turned to positions shown in dotted lines in which their trailing edges contact a vane 63 extending horizontally across all the passages. This arrangement constitutes a variable throat area convergent nozzle, and also permits the exhaust passages to be closed when the turbojets are not operating, so that reverse flow of hot gases from the ramjet engine is prevented.

The nozzles discharge into one end of a trough 64 which is open at its rear end. The trough has an open lower side 65 and a closed upper side 66 extending to the trailing edge of the wing. When the turbojets are operating, their exhaust fills the upper part of the trough. FIGURE 8 illustrates conditions during flight at subsonic speeds, the lower boundary of the hot turbojet jet stream being indicated approximately by a chain-dotted line 67a. The vane 63 may have a blunt base, in which case a zone of recirculating gas 68 forms behind it. A nozzle of this kind is described in our patent application No. 325,420.

Each combination ramjet passage 41 is provided, downstream of its combustor 43, with a variable throat area convergent-divergent nozzle constituted by flaps 69 hinged to the upper and lower walls and having their trailing edges forward of the trailing edges of the partition wall and of the flaps 62. These nozzles discharge into the trough 64 beneath the turbojet nozzles. During flight at subsonic speeds, when the combination ramjet is not operating, the flaps 69 are turned to positions such as those indicated in dotted lines in FIGURE 4B to reduce the drag to a minimum. The relatively cold air passing between the flaps then underlies the hot turbojet jet stream as indicated in FIGURE 8. The bottom wall of the high speed ramjet passages 33 terminates with expansion surfaces 75 of convergent-divergent configuration, while the upper wall 37 is provided with nozzle flaps 73, see FIGURE 4B. As with the combination ramjet nozzles, these are adjusted to a minimum-drag position during subsonic flight, the relatively cold air passing through the nozzles joining with that from the combination ramjets to fill the remainder of the trough 64.

The condition during transition to the combination ramjets is illustrated by FIGURE 9, the flight Mach number being for example about 1.0, shortly after light-up of the combination ramjets. The transition is accompanied by progressive lowering of the compression ramps 51 and 52, and the turbojet and combination ramjet nozzles are fully open. The hot exhaust from the turbojet engines fills the trough 64 down to a boundary indicated at 67b, while the hot exhaust from the combination ramjets underlies it down to a boundary 70b. The high speed ramjet nozzles are still partly closed and the relatively cold air passing through them fills the remainder of the trough down to a lower boundary 71b.

As the flight speed rises the throat areas of the turbojet and combination ramjet nozzles will be decreased, while the pressure ratio across them increases. FIGURE 10 illustrates the condition shortly before shut-down of the turbojet engines, say at about Mach 2.5. The turbojet jet stream has decreased in volume and now has a lower boundary 67c, while the combination ramjet exhaust has increased and requires a greater expansion volume, down to a lower boundary position 70c. The remainder of the trough 64 is filled by relatively cold air passing through the high-speed ramjet nozzles, down to the boundary 71c.

FIGURE 11 illustrates conditions after shutting down of the turbojet engines and on light-up of the high speed ramjets, say at about Mach 3.5. The hot exhaust from the combination ramjet engines expands up to the base of the trough 64, as indicated by boundary 67d which commences from the rear edge of the partition 36 (see FIGURE 4B), which constitutes a step, and extends downstream through the trough 64 to meet the upper side wall 66. A recirculatory body of gas at above atmospheric pressure is formed in a zone 72 behind the turbojet engines. The hot jet streams from the combination and high speed ramjets have a common boundary at 70d, these streams filling the whole of the remainder of the trough.

Conditions at the full cruising speed of say Mach 5, after the intake ramp system has been lowered into contact with the leading edge of the horizontal partition, thus shutting off the supply of air to the combination ramjets, are illustrated in FIGURE 12. Recirculatory bodies of gas form in zones 72 and 74 behind the now inoperative turbojet and combination ramjet engines with higher than atmospheric pressure. The hot exhaust from the high speed ramjets now expands to fill the whole of the remainder of the trough 64 with an upper boundary 67e which commences from the rear edge of the flap 73 (see FIGURE 4B), which constitutes a step, Sufficient air is preferably admitted from the intake or from the boundary layer air passages 55 to the diffuser passages to raise the static pressure in these passages to slightly above the pressure in the recirculatory regions 72 and 74. This air may be delivered into the closed end of the trough by slightly opening the nozzles of the inoperative engines, to thereby somewhat raise the pressure in the recirculatory regions also, and so obtain some increase in thrust from the exhaust jet of the operative engine.

The air intake is designed so that at about the maximum flight speed, when the rear end of the ramp is lowered into contact with the leading edge of the horizontal partition 37, and the ramps 51, 52 occupy the positions shown in chain-dotted lines in FIGURE 4A, shock waves originating at the leading edges of the ramps 51 and 52 will intersect in the region of the leading edge 78 of the bottom wall of the high speed ramjet diffuser 58.

In the embodiment shown in FIGURE 13 the lower speed engine is a turbofan engine 80 with a main combustion chamber 81 and means 82 for burning additional fuel in its by-pass duct 83. This form of engine has a greater speed range than the turbojet engine 11 shown in FIGURES 1 to 3, because the bypass duct 83 can remain in operation purely as a ramjet duct up to a flight speed of say Mach 4, after the supply of fuel to the combustor 81 has been cut off.

The higher speed engine is a ramjet duct 84 with flame holding means 85 and fuel injection means 86, suitably positioned and arranged for operation at speeds from Mach 1 up to say Mach 4, and with means 87 nearer its discharge nozzle for injecting fuel obliquely upstream into the duct. At speeds above Mach 4 all the fuel is supplied through the injection means 87, no additional mechanical flame holding device being necessary.

As in the embodiment shown in FIGURES 1, 2 and 3, both engines exhaust into one end of a trough 17 which is open at its rear end, the arrangement of the exhaust passage 88 of the turbofan engine 80 being similar to that of the engine 11 and having a lower wall 89 which is hinged to the lower wall of the exhaust passage at 90 and may be turned upwards to the position 89a, shown in dotted lines, to close the exhaust passage. The hinged wall 89 also serves to control the divergence of the nozzle of the ramjet duct 84, the opposite wall of the nozzle being constituted by a pair of ramps 91 and 92 hinged at their forward and rear ends respectively to the lower wall 93 of the engine housing so that they can be raised to positions such as 91a and 92a, shown in dotted lines, to vary the throat area of the nozzle.

Operation of the power plant may be as follows: For take-off and subsonic flight, the turbofan engine 80 is operated alone, the nozzle of the ramjet duct 84 being closed to the minimum drag position. Additional fuel may be burnt in the turbofan by-pass duct 83 for take-off if desired. For transonic acceleration, additional fuel is burnt in the duct 83, and the ramjet 84 is also brought into operation with fuel injection at 86 and possibly also at 87, the throat area of the ramjet duct being increased by lowering the ramps 91 and 92. At about Mach 2, reduction of the fuel supply to the main combustion chamber 81 of the turbofan engine begins, and falls to zero at about Mach 3. Between Mach 3 and Mach 4, the fuel supply to the ramjet duct at 86 is reduced to zero, that at 87 being correspondingly increased, and the nozzle throat area of the ramjet duct is reduced by raising the ramps 91 and 92. At about Mach 4, burning in the turbofan by-pass duct 83 is stopped, the hinged lower wall 89 of its exhaust passage is raised to the posiion 89a, closing the passage, and the exhaust gases of the ramjet duct 84 expand to fill the whole of the trough 17.

We claim:
1. A power plant for aircraft propulsion comprising at least two jet propulsion engines suitable for operation respectively at progressively higher ranges of supersonic flight speeds, and including a separate nozzle for the exhaust of each engine, a trough structure into one end of which the nozzles discharge, said trough structure having a closed base and an at least partially open side opposite the base, said end of the trough being otherwise closed and the other end open, the nozzle of the lowest flight speed engine being adjacent to the base of the trough and the other nozzles being displaced therefrom towards the open side of the trough in the order of their increasing corresponding flight speeds, and means for preventing reverse flow through a lower speed engine when a higher speed engine is operating and said low speed engine is not, the power plant including step means, lying between said higher speed engine and said lower speed engine, from which commences a boundary between a jet stream from said higher speed engine and a zone downstream from said non-operating lower speed engine, said boundary extending downstream through said trough to meet said base, whereby said jet stream expands over said boundary while causing a recirculatory body of gas at a pressure higher than ambient to form in said zone, said step means being distinct from said reverse-flow preventing means.

2. A power plant according to claim 1, in which there are engines for two ranges of speeds, namely a turbojet engine capable of operation throughout a speed range from zero to substantially greater than Mach 1, and a ramjet engine capable of operation throughout a speed range from at least as low as the top speed of the first engine to substantially above the top speed of the first engine.

3. A power plant according to claim 1, in which there are engines for two ranges of speeds, namely a turbofan engine capable of operation throughout a speed range from zero to substantially greater than Mach 1, and a ramjet engine capable of operation throughout a speed range from at least as low as the top speed of the first engine to substantially above the top speed of the first engine.

4. A power plant according to claim 1, in which there are engines for three ranges of speeds, namely a turbojet engine, a first ramjet engine and a second ramjet, and two intake passages, namely a first passage supplying air solely to the second ramjet engine, and a second passage supplying air both to the turbojet engine and to the first ramjet engine.

5. A power plant according to claim 4, including a single adjustable compression ramp system movable between a position enabling air to enter both diffuser passages and a position in which the ramp system direct air into the first diffuser passage and substantially blocks the second diffuser passage.

6. A power plant according to claim 1, in which the nozzle of the lowest speed engine is defined between a fixed forward continuation of the base of the trough and a wall member which is hinged at its forward end and can be moved into a position in which it closes the exhaust passage from the lowest speed engine the means constituting a step being between the hinge and the highest speed engine.

7. A power plant according to claim 1, including means for delivering air into the closed end of the trough adjacent to the nozzle of a lower speed engine when a higher speed engine is operating and said low speed engine is not.

References Cited
UNITED STATES PATENTS

| | | | |
|---|---|---|---|
| 2,909,894 | 10/1959 | O'Donnell | 60—35.6 X |
| 2,955,414 | 10/1960 | Hausmann | 60—35.6 |
| 3,199,291 | 8/1965 | Kelley et al. | 60—35.6 |

MARK NEWMAN, *Primary Examiner.*

D. HART, *Assistant Examiner.*